（12） United States Patent
Shaffer et al.

(10) Patent No.: US 7,196,305 B2
(45) Date of Patent: Mar. 27, 2007

(54) VEHICLE IMAGING PROCESSING SYSTEM AND METHOD HAVING OBSTRUCTED IMAGE DETECTION

(75) Inventors: Aric David Shaffer, Ypsilanti, MI (US); Ronald Hugh Miller, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 247 days.

(21) Appl. No.: 10/905,715

(22) Filed: Jan. 18, 2005

(65) Prior Publication Data

US 2006/0157639 A1   Jul. 20, 2006

(51) Int. Cl.
*H01L 27/00* (2006.01)
(52) U.S. Cl. .................... 250/208.1; 250/221
(58) Field of Classification Search ............. 250/208.1, 250/227.25, 221; 318/483; 340/539.26
See application file for complete search history.

(56) References Cited

U.S. PATENT DOCUMENTS

| 5,177,606 | A | 1/1993 | Koshizawa |
| 5,923,027 | A * | 7/1999 | Stam et al. ............... 250/208.1 |
| 2003/0025799 | A1 | 2/2003 | Holz et al. |
| 2003/0081815 | A1 | 5/2003 | Shima et al. |
| 2003/0165268 | A1 | 9/2003 | Franz |

* cited by examiner

*Primary Examiner*—Que T. Le
(74) *Attorney, Agent, or Firm*—Frank A. MacKenzie (57) ABSTRACT

An imaging system for a vehicle is provided. The system includes an image sensor generating a plurality of image frames, and a controller coupled to the image sensor. The controller is programmed to detect an obstructed image frame from the plurality of image frames. The obstruction corresponds to a windshield wiper of the vehicle. In response to detecting an obstructed image, the controller optimizes the obstructed image for display or use by a vehicle system. The controller detects an obstructed image by at least one of object sensing confirmation, edge detection, negative shift detection or headlight illumination detection.

20 Claims, 7 Drawing Sheets

Left Camera Image          Right Camera Image

VEHICLE IMAGING PROCESSING SYSTEM AND METHOD HAVING OBSTRUCTED IMAGE DETECTION

TECHNICAL FIELD

The present invention relates to imaging systems for automotive vehicles, and more particularly, the method and system for eliminating imaging system interference from vehicle wiper systems.

BACKGROUND

Remote sensing systems for vehicular applications are becoming more widely known and used. For example, remote sensing systems are known which use radar, lidar, or vision-based technologies for applications such as adaptive cruise control, collision avoidance, collision warning, lane departure, or improved night vision. In applications where cameras are employed, they are commonly configured to be mounted behind the windshield in the interior of the vehicle such that the cameras are protected from outside elements such as weather which may interfere with their ability to detect images. In particular, the cameras are often arranged such that they are within the sweep path of the windshield wipers to provide the best possible clarity for camera imaging. At the same time, however, the wiper blades themselves can pose imaging difficulties. Specifically, the wiper blades temporarily obstruct the camera view and may be interpreted as a detected object in the case of collision avoidance systems, or may render the image useless in the case of a night vision system or other visual aide to the driver.

Accordingly, there exists a need for an improved vehicle imaging processing system and method which eliminates imaging system interference from vehicle windshield wiper operation.

SUMMARY OF THE INVENTION

The present invention provides an improved vehicle imaging processing system and method which eliminates obstructions or interference from vehicle wiper operation.

In one embodiment, an imaging system for a vehicle is provided. The system includes an image sensor generating a plurality of image frames, and a controller coupled to the image sensor. The controller is programmed to detect an obstructed image frame from the plurality of image frames. The obstruction corresponds to a windshield wiper of the vehicle. In response to detecting an obstructed image, the controller optimizes the obstructed image for display or use by a vehicle system. The controller detects an obstructed image by at least one of object sensing confirmation, edge detection, negative shift detection or headlight illumination detection.

In another embodiment, the invention provides an imaging system for a vehicle having an object sensing system for detecting objects within a system field of view. The imaging system includes an image sensor located within a sweep path of a vehicle windshield wiper for generating a plurality of image frames, and a controller coupled to the image sensor. The controller is programmed to detect an obstructed image frame from said plurality of image frames, said obstruction corresponding to said windshield wiper of said vehicle and, in response thereto, optimize the obstructed image by removing the wiper obstruction from the obstructed image and communicating said optimized image for display or use by a vehicle system. The controller detects an obstructed image by confirming whether said object sensing system detects a substantially similar object as shown in said obstructed image frame.

A vehicle imaging system method is also provided. The method includes the steps of providing an image sensor within a windshield wiper sweep path of a vehicle, generating a plurality of images from said image sensor, detecting an obstructed image from said plurality of images, said obstruction corresponding to said windshield wiper, and in response to detecting an obstructed image, optimizing said image for display or use by a vehicle system. The step of detecting an obstructed image includes detecting by at least one of object sensing confirmation, edge detection, negative shift detection or headlight illumination detection.

The present invention is advantageous in that it removes the temporary blinding effect of automotive cameras mounted behind the windshield caused by the operation of windshield wipers. Other advantages and features of the present invention will become apparent when viewed in light of the detailed description when taken in conjunction with the attached drawings and appended claims.

BRIEF DESCRIPTION OF THE DRAWINGS

For a more complete understanding of the invention, reference should now be made to the embodiments illustrated in greater detail in the accompanied drawings and described below by way of examples of the invention. In the drawings.

DESCRIPTION OF THE PREFERRED EMBODIMENT

While the present invention is described with respect to a method and system for image processing for a vehicle imaging system, the present invention may be adapted and utilized in other imaging systems in which one or more image sensors process a scene, including applications outside the field of motor vehicle technology.

In the following description, various operating parameters and components are described for one constructed embodiment. These specific parameters and components are included as examples and are not meant to be limiting. Also, in the following figures, the same reference numerals will be used to identify the same components.

Figure 1:
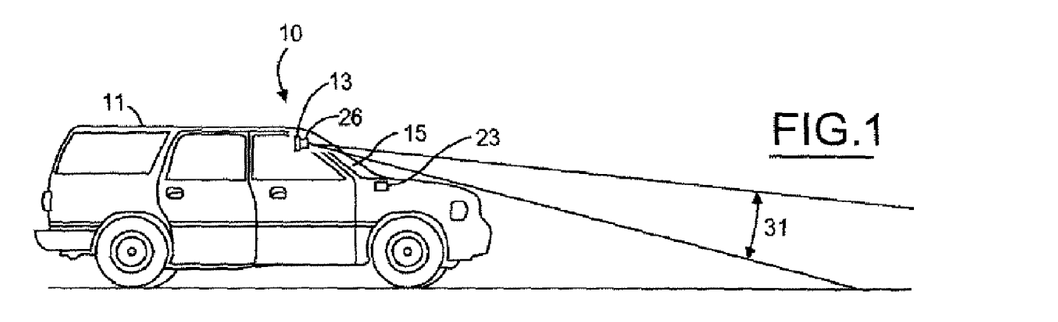
FIG. 1 is a side view of a vehicle equipped with an imaging processing system according to the present invention showing the imaging field-of-view.
Figure 2:
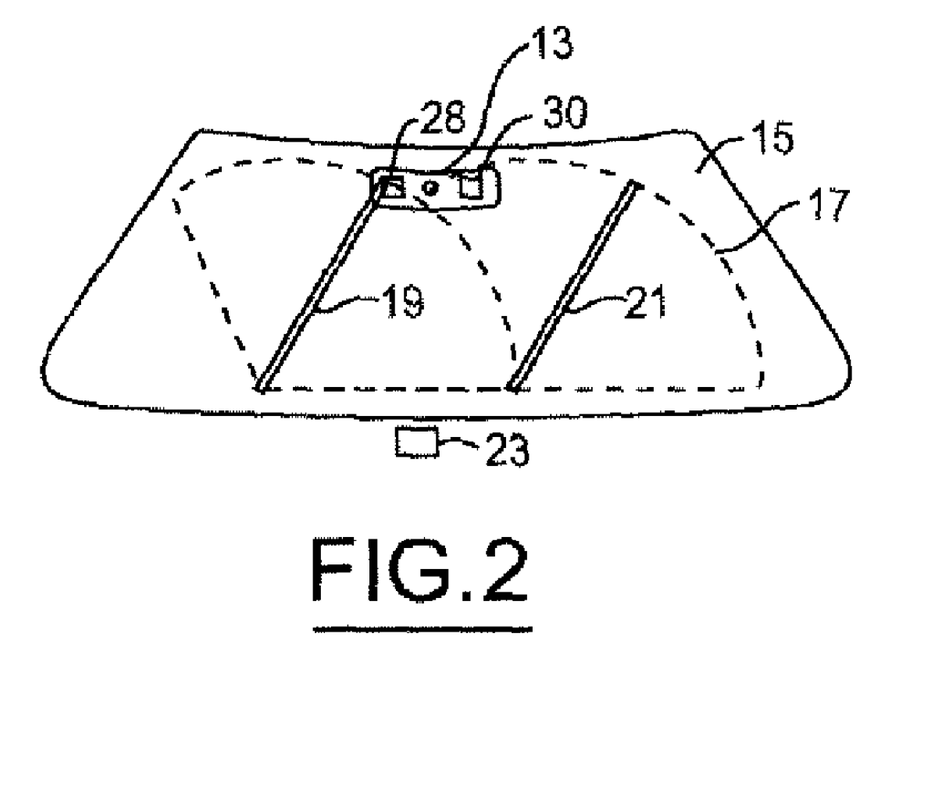
FIG. 2 is a schematic diagram of the windshield of the vehicle of FIG. 1 showing the windshield wiper interference with one of the cameras.

FIG. 1 shows a side view of a vehicle 11 with an imaging processing system 10 according to one embodiment of the present invention. The imaging processing system 10 includes a vision system 26 which is mounted behind the windshield 15 of the vehicle 11. In this example, as shown in FIG. 2, the vision system 26 includes a stereo pair of cameras 28, 30 mounted on the back side of the vehicle rearview mirror 13. To ensure a clear line of sight for the cameras 28, 30, they are located within the sweep path 17 of the windshield wipers 19, 21. The windshield wipers 19, 21 are driven by at least one wiper motor 23. Referring again to FIG. 1, the vision system 26 provides a forward field-of-view 31 for detecting and/or imaging objects forward of the vehicle 11.

Figure 3:
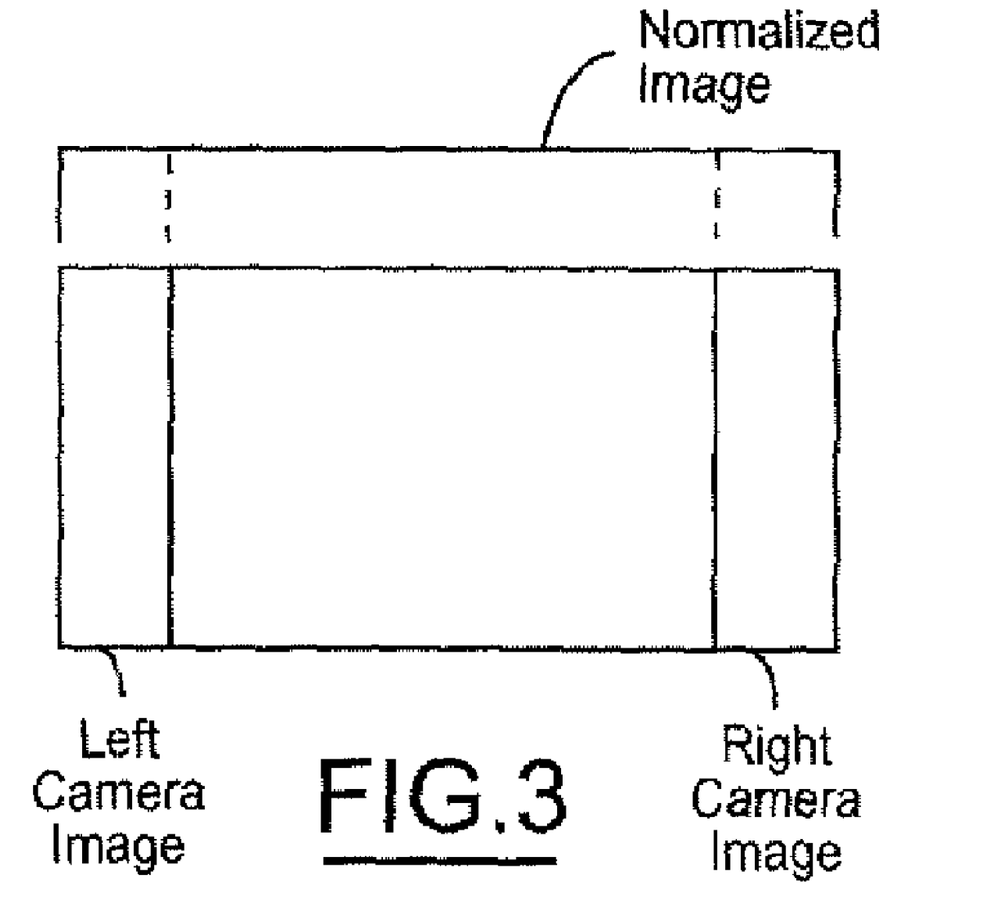
FIG. 3 is a schematic diagram of the normalized image resulting from the stereo camera pair.

FIG. 3 shows a schematic diagram of the normalized image resulting from the stereo camera pair 28, 30. In this example, the image from the left camera 30 is combined with the image from the right camera 28 to provide a combined image of the system field-of-view 31, referred to as a normalized image. This normalized image could then be displayed to the vehicle operator in the case of a night vision system, or could be used by a collision avoidance system or adaptive cruise control, for example, for object detection. Either the entire combined image or a portion thereof could be used by the particular application under consideration.

Figure 4:
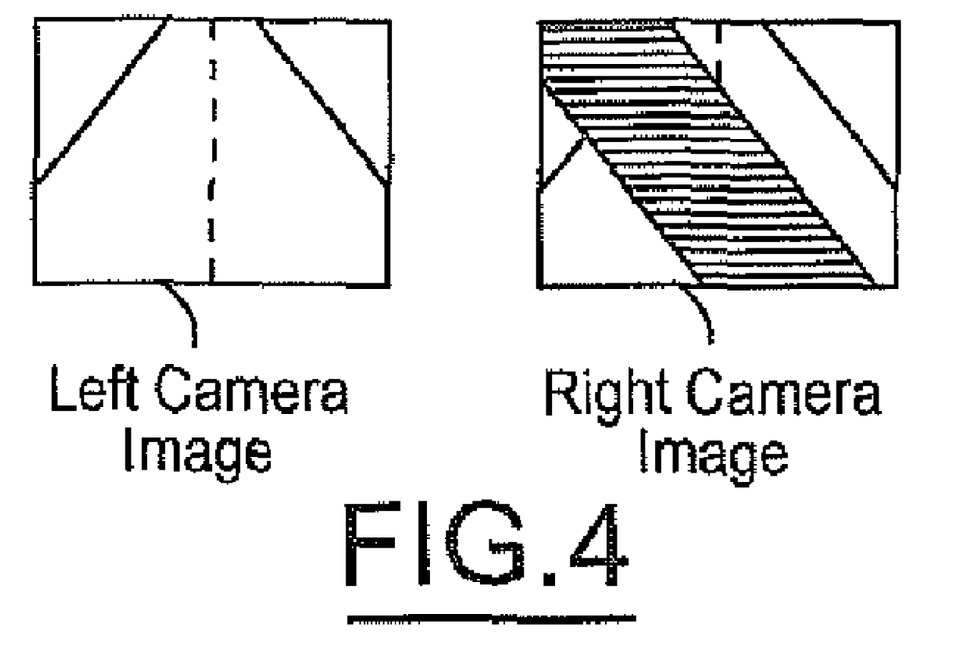
FIG. 4 shows exemplary left and right camera images during a windshield wiper obstruction of FIG. 2.

FIG. 4 shows exemplary images from the left camera 30 and right camera 28 for the embodiment of FIG. 2 wherein the right wiper 19 at least partially obstructs the field-of-view of the right camera 28. These camera images are processed according to one or more imaging schemes to improve the quality of the normalized image as explained in greater detail with respect to FIGS. 6 and 7. Also, although stereo camera images are shown, similar images could be generated by a single camera system (monocular). The imaging processing methods described herein are equally applicable to monocular and binocular camera systems.

Figure 5:
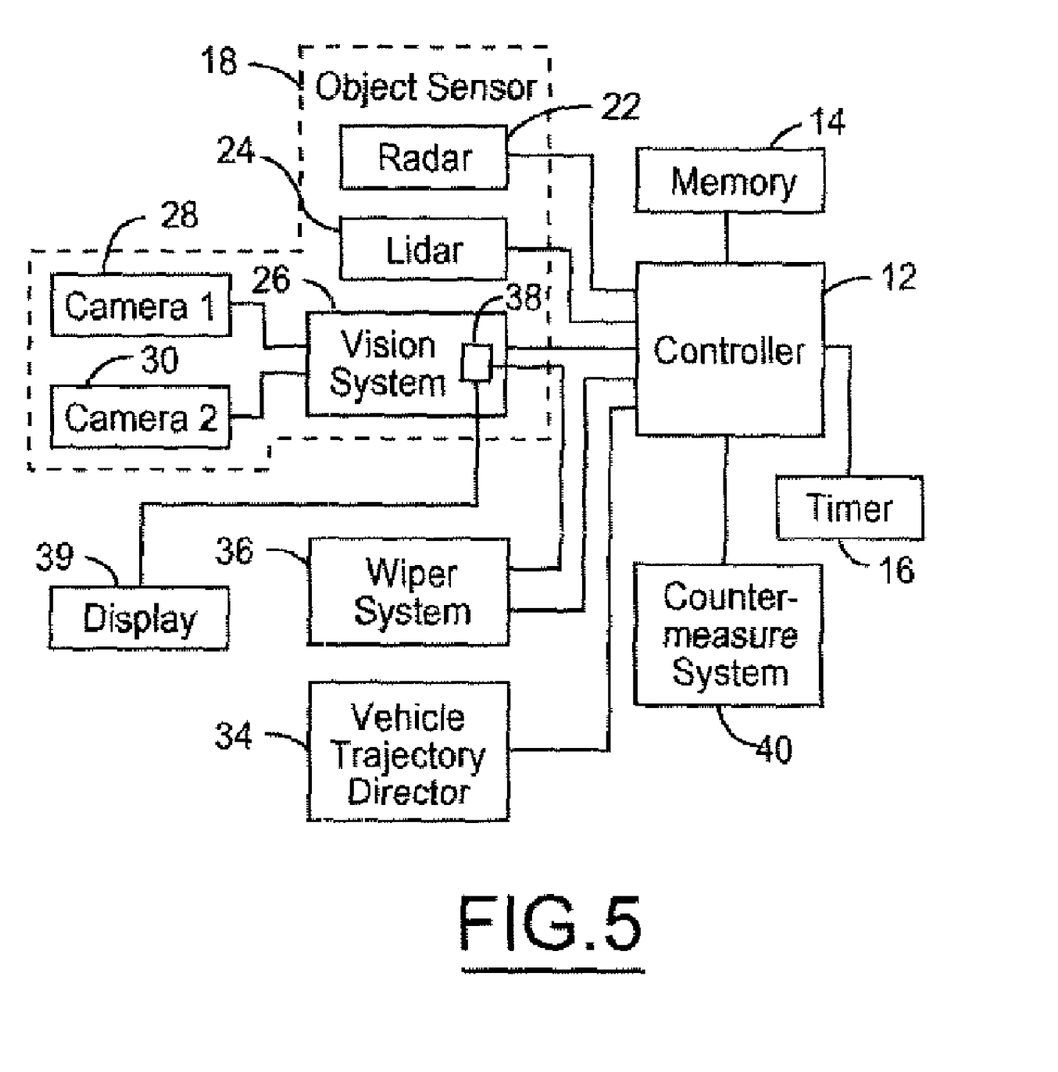
FIG. 5 is a block diagrammatic view and imaging processing system according to the present invention implemented within a vehicle pre-crash sensing system.

Referring now to FIG. 5, a block diagrammatic view of an imaging processing system according to the present invention is shown implemented in a pre-crash sensing system. The pre-crash system has a controller 12. Controller 12 can be a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down.

A remote object sensor 18 is coupled to controller 12. Remote object sensor 18 generates an object signal in the presence of an object within its field of view. Remote object sensor 18 may be comprised of one or a number of types of sensors including a radar 22, a lidar 24, and a vision system 26.

Vision system 26 may be comprised of one or more cameras, CCD or CMOS type devices. As illustrated, a first camera 28 and a second camera 30 may form vision system 26. When used as a stereo pair, cameras 28 and 30 acting together are capable of detecting the distance of an object from the vehicle. In this example, the cameras 28, 30 are arranged behind the windshield of the vehicle within the sweep path of the wipers.

In addition to the vision system 26, radar 22 or lidar 24 may be used to detect an object within a detection zone, and the vision system 26 may be used to confirm the presence of the object within the decision zone and to provide the size of the object to controller 12. Both radar 22 and lidar 24 are capable of sensing the presence and the distance of an object from the vehicle.

In another example, the cameras 28, 30 may use established triangulation techniques to determine the presence of an object and the distance from the vehicle as well as the object's size which may include area, height or width, or combinations thereof. In the case of vision systems, the object relative velocity information can be obtained from numerical differentiation techniques.

A vehicle trajectory detector 34 is also coupled to controller 12. The vehicle trajectory detector 34 generates a signal indicative of the vehicle traveling on a curved road. The vehicle trajectory detector 34 may comprise various numbers or combinations of sensors but preferably includes a yaw rate sensor, vehicle speed sensor and a steering wheel angle sensor. The yaw rate sensor provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner. The yaw rate sensor and the vehicle speed sensor, or the steering wheel angle sensor alone, or in combination with the vision or radar systems, may be used to indicate a curved road.

Controller 12 is used to control the activation of a countermeasure system 40. Each countermeasure may have an individual actuator associated therewith. In that case, controller 12 may direct the individual countermeasure actuator to activate the countermeasure. Various types of countermeasure systems will be evident to those skilled in the art. Examples of a countermeasure within a countermeasure system include occupant belt pretensioning, bumper height changing, braking, the pre-arming of internal airbags, the deployment of external or internal airbags, pedal control, steering column position, head restraint and knee bolster control. Preferably, controller 12 is programmed to activate the appropriate countermeasure in response to the inputs from the various sensors. The controller may choose the countermeasure based on the type and orientation of the target vehicle or object.

The controller 12 is also in communication with the wiper system 36. Wiper system 36 may include a rain sensor, wiper motor and wiper motor controller. Depending upon the type of wiper motor used, the angular position of the wipers may be discernable from the motor position. Otherwise, a wiper angle sensor may be included to provide wiper angle information to the controller.

In the example shown in FIG. 5, each system is shown as communicating with a central controller 12. Of course, separate controllers could be implemented for any of the systems. For example, the vision system 26 could include its own controller 38 in electronic communication with the wiper system 36. The controller 38 provides integrated control of the cameras 28, 30 and the image provided to the controller 12 for display 39 to the driver (for night vision systems) or use by the pre-crash sensing system. The vision system controller 28 includes a microprocessor in communication with inputs, outputs and computer readable media via a data/control bus or wireless communication network such as a Bluetooth network.

Computer readable media may include various types of volatile and non-volatile memory such as random access memory (RAM), read-only memory (ROM) or keep-alive memory (KAM). These functional descriptions of the various types of volatile and non-volatile storage may be implemented by any of a number of known physical devices including but not limited to EPROMs, EEPROMs, PROMs, flash memory and the like. Computer readable storage media include stored data representing instructions executed by the microprocessor to implement the method for eliminating the effects of wiper obstruction for the vision system according to the present invention.

Although FIG. 5 shows the imaging system and method according to the present invention in the context of a pre-crash sensing system, it could also be used in night vision applications, for example. In such cases, only the vision system 26, controller 38, cameras 28, 38 and a display 39 may be required.

Figure 6:
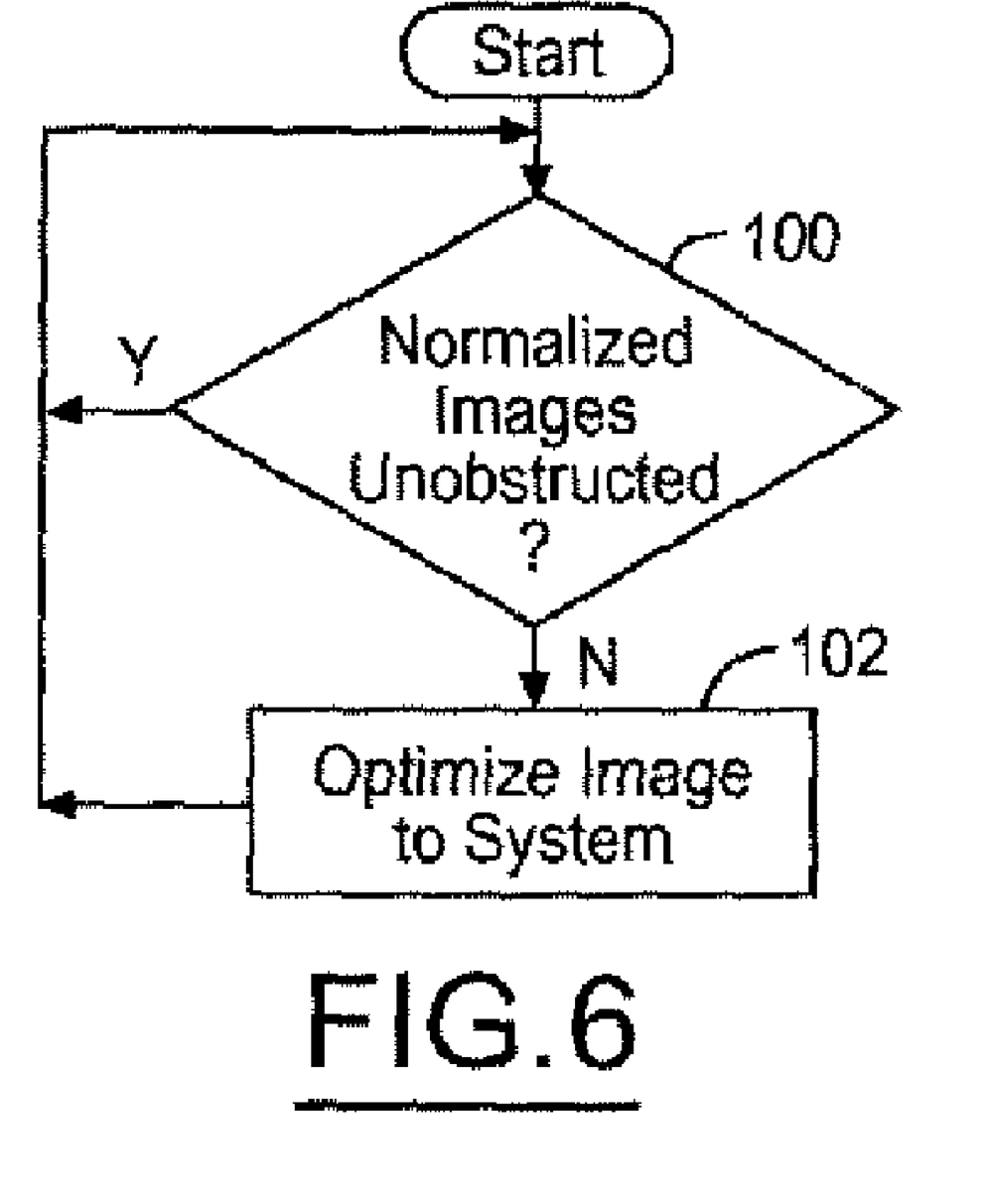
FIG. 6 is a logic flow diagram of one method of implementing the image processing system according to the present invention.

Several methods of optimizing a wiper-obstructed image for a vehicle camera system will now be described with respect to FIG. 6. Such images for binocular camera systems are shown, for example, in FIG. 4 wherein the right camera 28 is temporarily obstructed by the wiper 19 resulting in a camera image wherein a large portion of the image is characterized by a dark, diagonal band of pixels. For binocular camera systems, the logic initially determines whether the wiper system is operational. This can be determined from the vehicle information network or by determining whether the wiper switch is activated. The position of the wiper motor or motors may also be used to determine whether the present image enhancing logic routine needs to be active. If the wipers are on, the logic continues to step 100 wherein the system determines whether one of the pair of images is obstructed by a wiper blade. If obstructed, in step 102, the image used by the safety system or vision system is optimized by one of several methods described below.

Figure 7:
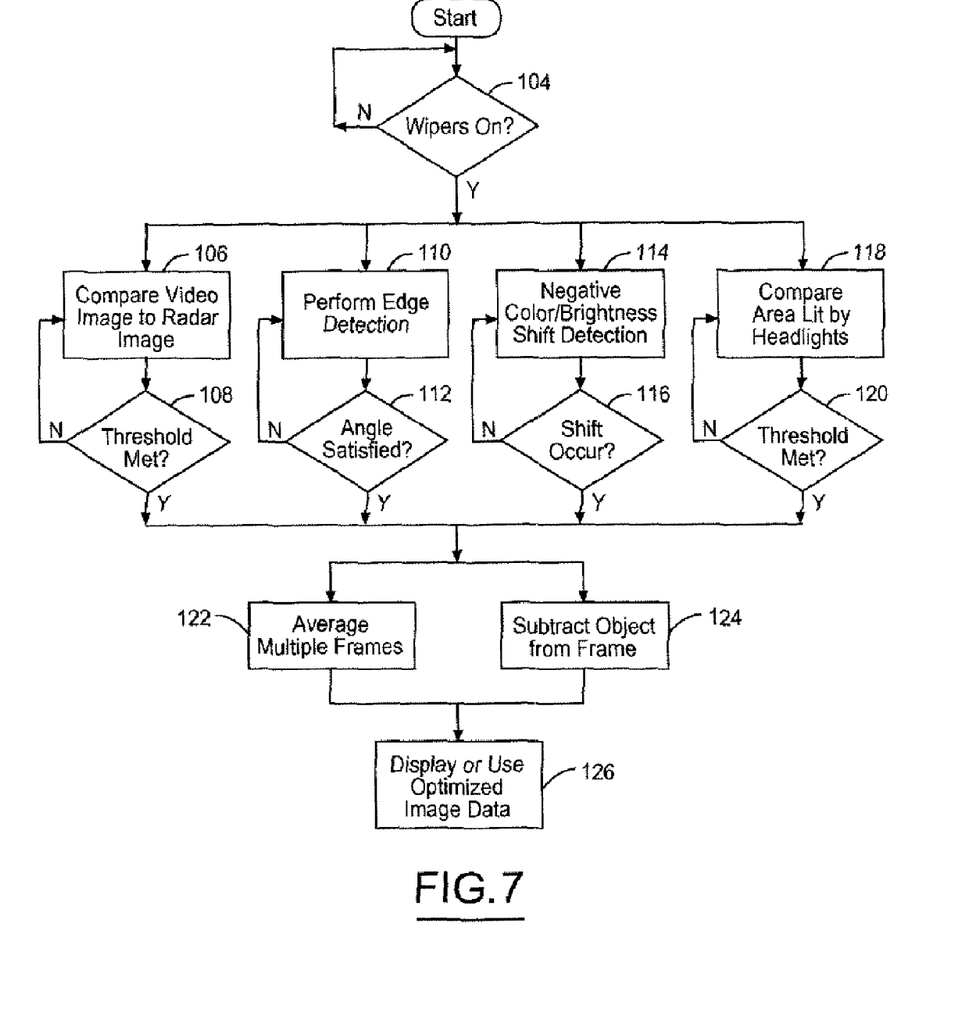
FIG. 7 is a logic flow diagram of another method of implementing the image processing system according to the present invention.

FIG. 7 shows a more detailed logic flow diagram of a method of eliminating a wiper obstruction for a vehicle camera. Again, the logic starts at step 104 wherein the system determines whether the wiper system is active. If the wipers are active, then the system continues to at least one of the following steps to determine whether a camera image is obstructed by a wiper blade. This is accomplished several ways which can each be used alone or in combination depending upon the amount of reliability and redundancy desired for the particular application under consideration. For night vision systems, for example, only one wiper obstruction technique may be appropriate, whereas in a collision avoidance application, redundant wiper obstruction determinations may be desirable for increased robustness.

Steps 106, 108 are referred to herein as object sensing confirmation. These steps are used in conjunction with an object sensing system. In one example, a camera image is compared to information received from the object sensing system such as a radar or lidar image in step 106. If the number of black or dark pixels for only the camera image is above a certain threshold in step 108, then the object in the camera view is determined to be the wiper blade. Alternatively, if the view forward of the vehicle from the camera compared to the view forward of the vehicle from the radar system deviates in excess of a given threshold, then the camera must be obstructed. A simplified method can also be performed wherein the object in the camera window is determined to be a wiper if the object sensing system does not also detect an object, i.e., it is not confirmed by the object sensing system.

Steps 110, 112 are referred to herein as edge detection. Step 110 shows another example of vehicle camera obstruction detection using edge detection techniques on the camera image. In step 110, the image processing system scans the image for a dark object at a certain angle across substantially the entire image (if the camera is positioned such that the wiper will obstruct most of the image). This can be accomplished by mathematically computing the slope of the detected edge and comparing the value to a range of angle values corresponding to the angular position of the wiper. Thus, if the slope value is within the range of expected values, a wiper obstruction is declared in step 112. Reliability can be improved if the object within the image is also determined to be very dark and if the object spans substantially the entire image. Alternatively, the video image can be compared to a lookup table of images containing obstructed views. If the camera image substantially matches one of the lookup table images, a wiper obstruction is declared.

A further wiper obstruction detection technique is disclosed in steps 114, 116. Steps 114, 116 are referred to herein as negative shift detection. This method can be used when the camera images are captured in excess of 30 frames per second. Each frame is compared to the previous image. When no wiper is obstructing the images, no significant change in any area of the image will occur. As the wiper starts to move into the camera view a negative change (dx/dt) in the form of a color or brightness shift in a large pixel area of the image will occur. The subsequent image will capture a larger portion of the wiper as it moves across the camera image field of view. Because more of the image will be obstructed by the wiper, a positive change (dx/dt) in color or brightness for a large portion of the image will register as compared to the previous image. In step 116, if a negative shift is detected, followed by a positive shift, then a wiper obstruction is declared.

Steps 118, 120 disclose a further wiper obstruction detection step which may be used during nighttime driving conditions. Steps 118, 120 are referred to herein as headlight illumination detection. In this example, the area of the image corresponding to the roadway ahead of the vehicle normally illuminated by the headlights is compared to a threshold area. In the case of wiper obstruction, the area detected would be less than a threshold area. In such a case, a wiper obstruction is declared in step 120.

The wiper obstruction methods of object sensing confirmation, edge detection, negative shift detection and headlight illumination detection may be used alone or in any combination depending upon the level of robustness desired for the system. For example, night vision systems merely displaying information to a vehicle operator may not require near perfect wiper obstruction detection as it is unlikely that the driver would react to an impulse event such as the wiper obstruction being displayed as part of the driver information presentation. Other safety systems, such as pre-crash sensing and warning systems which may act in response to detected events, however, may desire more robust wiper obstruction detection to prevent such systems from declaring an object detection.

Once a wiper obstruction is declared, the image presented to the driver or safety system should be optimized. That is, that portion of the image containing the wiper blade should be removed or otherwise hidden such that it improves the display to the vehicle operator or data sent to the safety system. Steps 122 and 124 present two methods of optimizing the camera image when a wiper obstruction is detected. Step 122 is referred to herein as frame averaging. Step 122 is particularly useful when the camera is operating in excess of 30 frames/second. In such a case, multiple frames can be averaged to provide a useful image. This is accomplished by taking the average of the frame prior to the wiper obstruction and the obstructed frame. A shadow or lighter image of the wiper results, called the new frame. This new frame can then be further optimized to reduce the visibility of the wiper. For example, an offset value can be added to image or histogram equalization can be performed over the area of the frame with the reduced wiper image.

Step 124 is referred to herein as obstruction subtraction. Step 124 minimized the visibility of the wiper by using the diagonal middle portion of the frame preceding the wiper-obstructed frame and merging the two frames. Thus, the unobstructed middle portion of the previous frame will overlay the wiper obstruction to mask the obstruction. In addition, the wiper obstruction can be first deleted from the frame, then masked with the middle, unobstructed, portion of the preceding frame.

In step 126 the optimized camera image, with the obstruction minimized or eliminated, is presented to the display or other vehicle safety system for further use.

While particular embodiments of the invention have been shown and described, numerous variations and alternate embodiments will occur to those skilled in the art. Accordingly, it is intended that the invention be limited only in terms of the appended claims.

What is claimed is:

1. An imaging system for a vehicle comprising:
   an image sensor generating a plurality of image frames; and
   a controller coupled to said image sensor, the controller programmed to detect an obstructed image frame from said plurality of image frames, said obstruction corresponding to a windshield wiper of said vehicle and, in response thereto, optimize the obstructed image for display or use by a vehicle system,
   wherein the controller detects an obstructed image by at least one of object sensing confirmation, edge detection, negative shift detection or headlight illumination detection.

2. A system according to claim 1 wherein said image sensor comprises first and second cameras mounted behind the vehicle windshield in the sweep path of the vehicle wipers.

3. A system according to claim 1 comprising an object sensing system, wherein object sensing confirmation comprises determining whether said objecting sensing system confirms that no object similar to an object within said obstructed image frame is present within a system field of view.

4. A system according to claim 3 wherein said object sensing system comprises a radar or lidar sensor.

5. A system according to claim 1 wherein said controller detects an obstructed image by edge detection comprising determining an angle or area of an obstruction within said obstructed image and comparing said angle or area to threshold angle and area limits.

6. A system according to claim 1 wherein said controller detects an obstructed image by negative shift detection comprising determining a color or brightness shift from a preceding image to said obstructed image.

7. A system according to claim 1 wherein said controller detects an obstructed image by headlight illumination comprising, during night driving, comparing an area within a system field of view illuminated by headlights of said vehicle with a threshold area to determine whether said area is obstructed from view by a vehicle wiper.

8. A system according to claim 1 wherein optimizing the obstructed image comprises at least one of averaging multiple image frames or masking a wiper portion of the obstructed image.

9. A system according to claim 1 wherein said image sensor generates images 30 fps or greater.

10. An imaging system for a vehicle having an object sensing system for detecting objects within a system field of view, the imaging system comprising:
    an image sensor located within a sweep path of a vehicle windshield wiper for generating a plurality of image frames; and
    a controller coupled to said image sensor, the controller programmed to detect an obstructed image frame from said plurality of image frames, said obstruction corresponding to said windshield wiper of said vehicle and, in response thereto, optimize the obstructed image by removing the wiper obstruction from the obstructed image and communicating said optimized image for display or use by a vehicle system,
    wherein the controller detects an obstructed image by confirming whether said object sensing system detects a substantially similar object as shown in said obstructed image frame.

11. A system according to claim 10 wherein said image sensor comprises first and second cameras mounted behind the vehicle windshield in the sweep path of the vehicle wipers.

12. A system according to claim 11 wherein said object sensing system comprises a radar or lidar sensor.

13. A system according to claim 12 wherein object sensing confirmation comprises determining whether an objecting sensing system confirms that no object similar to said object within said obstructed image frame is present within a system field of view.

14. A system according to claim 10 wherein optimizing the obstructed image comprises at least one of averaging multiple image frames or masking a wiper portion of the obstructed image.

15. A system according to claim 10 wherein said image sensor generates images 30 fps or greater.

16. A vehicle imaging system method comprising:
    providing an image sensor within a windshield wiper sweep path of a vehicle;
    generating a plurality of images from said image sensor;
    detecting an obstructed image from said plurality of images, said obstruction corresponding to said windshield wiper; and
    in response to detecting an obstructed image, optimizing said image for display or use by a vehicle system,
    wherein the step of detecting an obstructed image includes detecting by at least one of object sensing confirmation, edge detection, negative shift detection or headlight illumination detection.

17. A method according to claim 16 wherein said image sensor comprises first and second cameras mounted behind the vehicle windshield in the sweep path of the vehicle wipers.

18. A method according to claim 16 wherein detecting an obstructed image by object sensing confirmation comprises determining whether an objecting sensing system confirms that no object similar to an object within said obstructed image frame is present within a system field of view.

19. A method according to claim 16 wherein detecting an obstructed image by edge detection comprises determining an angle or area of an obstruction within said obstructed image and comparing said angle or area to threshold angle and area limits.

20. A method according to claim 16 wherein detecting an obstructed image by negative shift detection comprises determining a color or brightness shift from a preceding image to said obstructed image.

* * * * *